United States Patent Office 2,758,662
Patented Aug. 14, 1956

2,758,662

DEVICE FOR MOUNTING TRANSMISSION MEMBERS OR REDUCTION GEARS ON THE CHASSIS OR BODY OF MOTOR VEHICLES

Lucien Peras, Billancourt, France, assignor to Regie Nationale des Usines Renault, Billancourt, France Application November 12, 1953, Serial No. 391,687

Claims priority, application France November 21, 1952

4 Claims. (Cl. 180—70)

This invention has for its object to provide a device for mounting and suspending transmission members or reduction gears on the chassis or the body of motor vehicles.

In certain devices for the transmission of movement to the driving wheels of a vehicle, it has been desired to obtain all the advantages which are presented by the diminution of unsprung weight and the lowering of the center of gravity.

For this purpose, the transmission to the driving wheels is no longer effected from a "bridge" integral with the casings of the lateral half-shafts and connected to the body or to the chassis of the vehicles by suspension springs.

The member which distributes the movement and the driving force to the wheels is fixed to the chassis or to the body and the lateral half-shafts are articulated to the outlet of this member by rotating and expansion joints such as swivel joints or universal joints, splined shafts, and like members, and these shafts are connected in the same way at their ends to the driving wheels.

This arrangement is evidently applicable to rear wheel drive or to front wheel drive, or even to four wheel drive.

However, the direct fixing to the body or to the chassis of a member the casing of which is subjected to and can transmit all the variations arising from momentary or prolonged unbalance between the driving and resisting torques, as well as the effects on this unbalance of the displacement of the wheels under the action of uneven ground, has a serious drawback in that the vibrations and the jolts are transmitted directly to the body and are the source of noises prejudicial to the comfort of the passengers.

The fixing of the casing of the reduction gear member to the chassis by resilient suspension bolts attenuates in part this drawback, but does not completely overcome it.

The device forming the subject of commonly owned co-pending application Serial Number 335,580 of February 6, 1953, for "Resilient Mounting of Transmission Housing Suspending Axially-Spaced Drive Axles," also forms a very good solution based on mechanical considerations. This application has become Patent No. 2,738,024, March 13, 1956.

The device for mounting and suspension which is the subject of the present invention can be applied to all reduction gear members, whether they are classical, like the rear axles of vehicles, or my above mentioned device. It consists of interposing between the transmission complex casing and the body (or the chassis) resilient suspension means which are subjected only to the weight of the member and the mechanical reactions of the single transmission member.

This weight is small enough not to necessitate devices of large dimensions as the main loading springs. The devices which are the subject of the invention can greatly reduce the unsprung weight, from which there is obtained an appropriate resilience without entailing cost out of proportion to those necessitated by a single and total suspension of the whole from the rear axle or from the front axle.

On the other hand, the points of support can be suitably distributed on the body or the chassis, sufficiently spaced so as not to create local bending, and each is provided with a contact surface which is sufficiently large to accommodate forces of pressure and of traction.

By way of example, there will be described hereafter with reference to the accompanying drawings, a specific embodiment of a device for suspension of the bracket supplied to a rear transmission, in which the suspension devices are two spring blades each supporting at two points, through the intermediary of resilient blocks, an end of the bracket, these blades being fixed to the chassis or to the body. Their length can be determined so as not to transmit the vibrations of the bracket or of the transmission, the supporting points being in this case chosen in the zone of the nodes of the main vibrations and of their harmonics.

1 is the casing of the reduction gear which has at its ends fixing lugs 3 at the front and fixing lugs 4 at the rear.

In the device shown, which is applicable, by way of example, to the device of my patent application referred to above, the lugs 3 and 4 are not on the same horizontal plane, but this plane contains the axis of the Cardan joint which connects the transmission to the input shaft of the reduction gear member.

Figure 1:
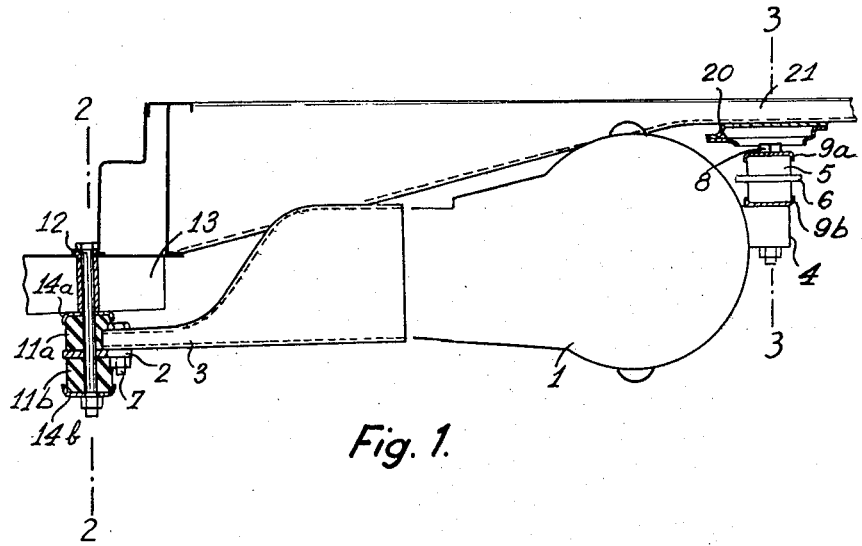
Figure 1 shows a longitudinal view of the device.
Figure 2:
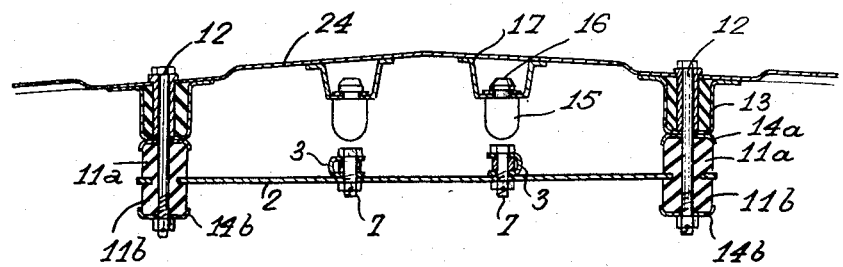
Figure 2 is an end view of the same device as seen along the line 2—2.

In front, as shown in Figure 2, the lugs 3 are connected by cottered bolts 7 to the spring blade 2, the ends of which are supported by pads 11a and 11b of resilient material, covered with cup members 14a and 14b which receive the bolts 12 for fixing to the body. These latter are secured to the ribs 13 reinforcing the body and pass through, without touching, the spring blade 2.

It will be noticed, on the other hand, that the floor of the body 24 is provided with two stirrups 17 which receive stop pads 15 of fairly hard plastic material fixed to the stirrups 17 by rivets 16.

Figure 3:
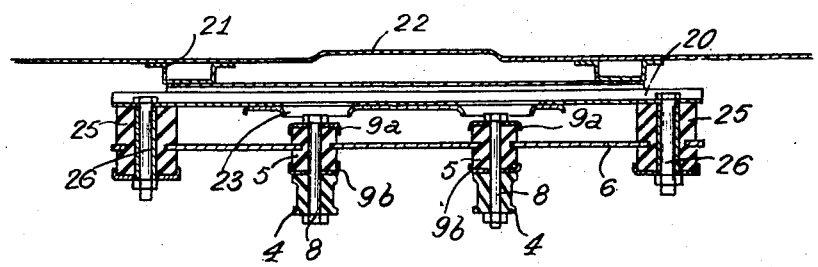
Figure 3 is an end view of the same device as seen along the line 3—3.

At the rear, as shown in Figure 3, the lugs 4 rest directly on the cup members 9a, which cover the pads 5 of resilient material. These latter receive the upper part of other cup members 9b, which serve as supports for the fixing bolts passing through the group of resilient pads 5 and lugs 4, without touching the spring blade 6. In short, this blade is the support of the rear part of the device.

In its turn, the spring blade 6 is fixed by means of pads 25 of resilient material on the cross member 20, by means of bolts 26. Of course, the bolts 26 pass through the spring blade 6 without touching it.

The cross member 20 is fixed by rivets, bolts, or by welding, on the ribs 21 which form part of the chassis or of the body, to which they are secured by welding, or any other means, on the floor 22.

In operation, the oscillations to which the reduction gear member 1 is subjected are absorbed simultaneously by the spring blades 2 and 6 and by the supports of these blades which are formed by the resilient pads 11a, 11b, 5 and 25.

I claim:

1. In a wheeled vehicle having a frame and a body connected thereto to define the vehicle body unit, and a power transmission mechanism, means for elastically mounting and suspending said mechanism in said unit, said means comprising transverse spring blades supported at their ends in resilient support elements, said support elements being carried by said unit, one of said spring blades being disposed at the forward end of said mechanism and another of said spring blades being disposed at the rearward end of said mechanism, said mechanism being secured to said spring blades at points intermediate their ends.

2. In a wheeled vehicle having a frame and a body connected thereto to define the vehicle body unit and a power transmission mechanism, means for elastically mounting and suspending said mechanism in said unit, said means comprising transverse spring blades supported at their ends in resilient support elements, said support elements being carried by said unit, one of said spring blades being disposed at the forward end of said mechanism and another of said spring blades being disposed at the rearward end of said mehcanism, said mechanism being secured to said spring blades at points intermediate their ends, resilient means being interposed between the mechanism and the points at which said mechanism is secured to at least one of the blades.

3. In a wheeled vehicle having a frame and a body connected thereto to define the vehicle body unit and a power transmission mechanism, means for elastically mounting and suspending said mechanism in said unit, said means comprising transverse spring blades supported at their ends in resilient support elements, said support elements being carried by said unit, one of said spring blades being disposed at the forward end of said mechanism and another of said spring blades being disposed at the rearward end of said mechanism, said mechanism having lugs at each end secured to said spring blades at points intermediate the blade ends.

4. In a wheeled vehicle having a frame and a body connected thereto to define the vehicle body unit and a power transmission mechanism, means for elastically mounting and suspending said mechanism in said unit, said means comprising transverse spring blades supported at their ends in resilient support elements, said support elements being carried by said unit, one of said spring blades being disposed at the forward end of said mechanism and another of said spring blades being disposed at the rearward end of said mechanism, said mechanism having lugs at each end and means securing said lugs to said spring blades at points intermediate the blade ends, said body unit being provided with palstic buffers for engagement with said securing means.

References Cited in the file of this patent

UNITED STATES PATENTS

| 2,112,628 | Lee | Mar. 29, 1938 |
| 2,681,118 | Roller | June 15, 1954 |

FOREIGN PATENTS

| 745,552 | Germany | Mar. 13, 1944 |